US008838027B2

(12) United States Patent
Waters (10) Patent No.: US 8,838,027 B2
(45) Date of Patent: Sep. 16, 2014

(54) APPARATUS FOR AND METHOD OF SELECTING BETWEEN ANTENNAS FOR WIRELESS COMMUNICATION

(75) Inventor: John Waters, Bath (GB)

(73) Assignee: QUALCOMM Incorporated, San Diego, CA (US)

( * ) Notice: Subject to any disclaimer, the term of this patent is extended or adjusted under 35 U.S.C. 154(b) by 1260 days.

(21) Appl. No.: 12/019,898

(22) Filed: Jan. 25, 2008

(65) Prior Publication Data

US 2008/0182512 A1 Jul. 31, 2008

(30) Foreign Application Priority Data

Jan. 25, 2007 (GB) .................................. 0701413.7

(51) Int. Cl.
*H04B 5/02* (2006.01)
*H04B 5/00* (2006.01)
*H04B 7/08* (2006.01)
*H04B 7/06* (2006.01)

(52) U.S. Cl.
CPC ................ *H04B 5/00* (2013.01); *H04B 7/0805* (2013.01); *H04B 7/0817* (2013.01); *H04B 7/0608* (2013.01)
USPC ......... 455/41.2; 455/41.1; 455/103; 455/101; 455/69; 455/91; 455/272; 455/63.1; 455/575.7; 455/418; 455/77; 340/10.1

(58) Field of Classification Search
USPC .................. 455/41.1, 103, 101, 69, 272, 63.1, 455/575.7, 418, 77, 280, 150.1, 41.2; 340/10.1
See application file for complete search history.

(56) References Cited

U.S. PATENT DOCUMENTS

| 4,542,532 | A  | * | 9/1985  | McQuilkin ...................... 455/78 |
| 5,455,575 | A  | * | 10/1995 | Schuermann ................... 342/42 |
| 5,491,715 | A  | * | 2/1996  | Flaxl .............................. 375/344 |
| 6,023,610 | A  | * | 2/2000  | Wood, Jr. ....................... 455/101 |
| 6,173,899 | B1 | * | 1/2001  | Rozin ............................ 235/492 |
| 6,236,315 | B1 | * | 5/2001  | Helms et al. ............... 340/572.7 |
| 6,483,427 | B1 | * | 11/2002 | Werb ........................... 340/10.1 |
| 6,531,984 | B1 | * | 3/2003  | Johannisson et al. .. 343/700 MS |
| 6,703,935 | B1 | * | 3/2004  | Chung et al. ............... 340/572.7 |
| 6,837,438 | B1 | * | 1/2005  | Takasugi et al. ............. 235/492 |
| 7,158,033 | B2 | * | 1/2007  | Forster ....................... 340/572.1 |
| 8,150,321 | B2 | * | 4/2012  | Winter et al. ................ 455/41.2 |
| 8,270,911 | B2 | * | 9/2012  | Tuttle .............................. 455/73 |
| 2001/0053675 | A1 | * | 12/2001 | Plettner .......................... 455/91 |
| 2005/0064825 | A1 |   | 3/2005  | Forrester |
| 2005/0087599 | A1 | * | 4/2005  | Ward et al. .................... 235/451 |
| 2005/0280508 | A1 | * | 12/2005 | Mravca et al. ............... 340/10.2 |
| 2006/0052055 | A1 | * | 3/2006  | Rowse et al. ................ 455/41.1 |

FOREIGN PATENT DOCUMENTS

| EP | 1 691 448 A1 | 8/2006 |
| WO | WO-98/27670 A1 | 6/1998 |
| WO | WO 2006/114731 A1 | 11/2006 |
| WO | WO 2006/134428 A1 | 12/2006 |

\* cited by examiner

*Primary Examiner* — Ganiyu A Hanidu
(74) *Attorney, Agent, or Firm* — Fulbright & Jaworski LLP (57) ABSTRACT

A communication device comprising at least first and second antennas wherein a quality of communication between the communication device 2 and a further device 20 is assessed when using the at least first and second antennas 8, 10, 12 so as to select one of the at least first and second antennas for further communications between the communication device and the further device.

15 Claims, 6 Drawing Sheets

APPARATUS FOR AND METHOD OF SELECTING BETWEEN ANTENNAS FOR WIRELESS COMMUNICATION

FIELD OF THE INVENTION

The present invention relates to an apparatus, method and system for RF communications.

SUMMARY OF THE INVENTION

According to a first aspect of the present invention there is provided a near-field communication device comprising at least first and second antennas wherein a quality of near-field communication between the near-field communication device and a further device is assessed when using the at least first and second antennas so as to select one of the at least first and second antennas for further communications between the near-field communication device and the further device.

According to a second aspect of the present invention there is provided a method of selecting between a plurality of antennas in a near-field communication device wherein a quality of near-field communication between the near-field communication device and a further device is assessed when using at least first and second antennas so as to select one of the at least first and second antennas for further communications between the near-field communication device and the further device.

According to a third aspect of the present invention there is provided a near-field communication system comprising: a near-field communication device having at least first and second antennas, and a transmit-receive device; and a further device having a further antenna; wherein a quality of near-field communication between the transmit-receive device and the further device is assessed when using the at least first and second antennas so as to select one of the at least first and second antennas for further communications between the transmit-receive device and the further device.

BRIEF DESCRIPTION OF THE DRAWINGS

The present invention will further be described, by way of example only, with reference to the accompanying drawings, in which.

DESCRIPTION OF PREFERRED EMBODIMENTS OF THE PRESENT INVENTION

Figure 1:
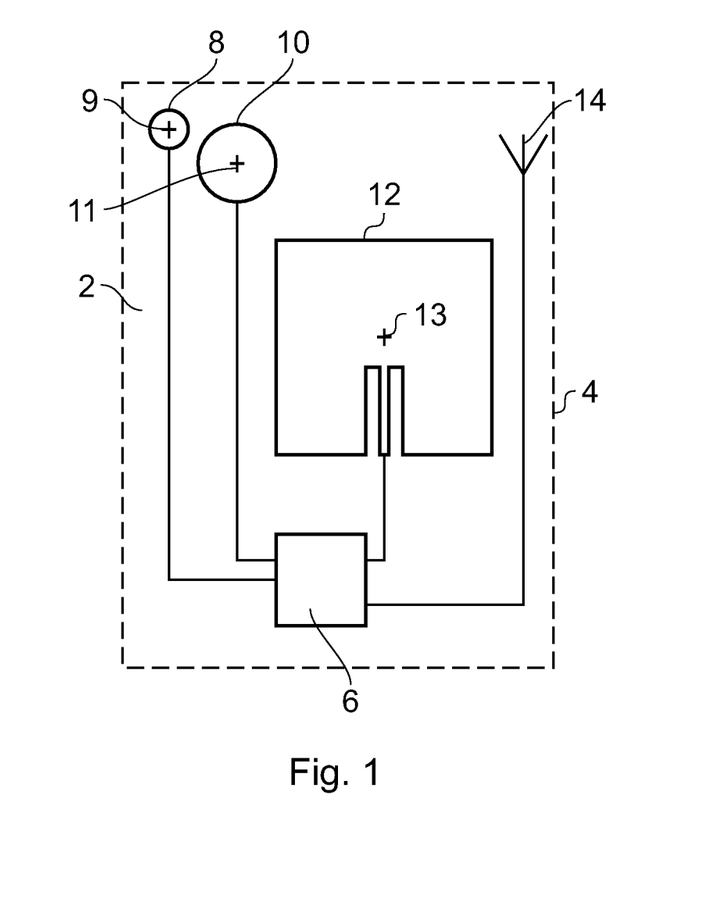
FIG. 1 schematically illustrates a communication device constituting an embodiment of the invention.

FIG. 1 shows a communication device constituting an embodiment of the invention generally designated 2 and comprising a housing 4, a transmit-receive device 6, a first antenna 8, a second antenna 10, a third antenna 12 and a fourth antenna 14. It should be understood that four antennas are shown in FIG. 1 for the purposes of illustration only and the number of antennas is only limited in so much as there should be at least two antennas. The electromagnetic coupling between a first one of the antennas 8, 10, 12 or 14 and a further antenna of a further device is substantially different to the electromagnetic coupling between a second one of the antennas 8, 10, 12 or 14 and the further antenna of the further device. This may be achieved by the provision of antennas having substantially different physical sizes and/or geometries. In FIG. 1 for example, the antennas 8, 10, 12 and 14 are formed such that the first antenna 8 has a relatively small loop geometry, the second antenna 10 has a larger loop geometry and the third antenna 12 has a relatively large patch geometry. The antennas may be formed on a planar substrate. Although the fourth antenna 14 is depicted schematically, it should be understood that its size and/or geometry are substantially different from those of the other antennas. The relative sizes and geometries of the different antennas shown in FIG. 1 are chosen to be illustrative only, and the invention is not limited to the relative sizes or geometries shown. At least two of the antennas 8, 10, 12 and 14 have a respective principal axis of radiation that extends in the direction perpendicular to the plane of FIG. 1. For example, antennas 8, 10 and 12 have respective principal axes designated 9, 11 and 13 respectively. The antennas 8, 10, 12 and 14 are physically arranged so as to be non-overlapping when viewed along the direction of their principal axes thus avoiding any screening of the electromagnetic field coupled with each antenna that would otherwise occur when communicating with a further device positioned adjacent and in approximate superposition with one or more of the antennas. However, the antennas could be overlapping and may be co-axial. Indeed it is also possible for two or more of the antennas to have parts of their structure in common.

Figure 2:
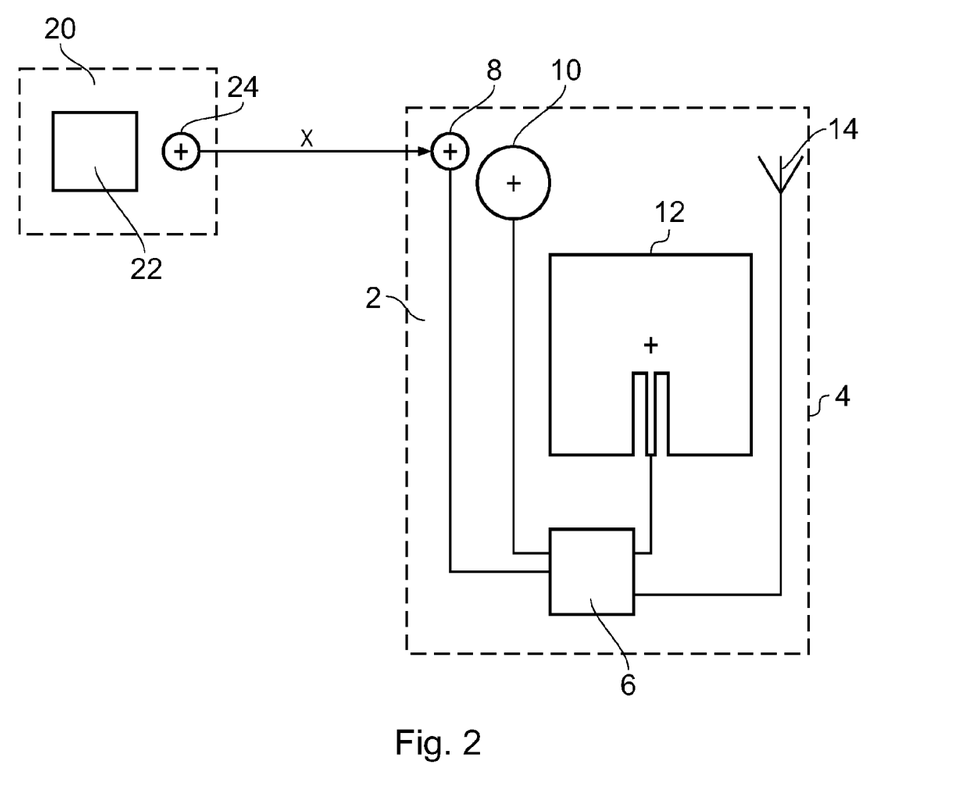
FIG. 2 schematically illustrates a communication system constituting an embodiment of the invention.

In use, as shown in FIG. 2, the communication device 2 communicates with a tag generally designated 20 which has an integrated circuit 22 containing data and is in communication with an antenna 24. The tag 20 can store information that advantageously relates to an object to which it may be attached. This information may be transferred to/from the communication device 2 when one of the communication device antennas is brought into proximity with the tag antenna 24. The tag can, for example, be a passive tag that is irradiated by an RF electromagnetic field from one or more of the communication device antennas. Information can then be transferred from the tag to the communication device using load modulation whereby the coupling between the tag and the communication device is modulated by a circuit within the tag in response to the data stored in the tag, and the resulting change in power absorbed by the tag from the RF field is detected by the transmit-receive device 6 of the communication device 2. Such near-field communications (NFC) enable, amongst other things, service initiation, peer-to-peer data transfer, and payment and ticketing operations to be performed. An example of a service initiation application is a "SmartPoster" which may be promoting a product, service, or an event. By bringing the communication device 2 into relatively close proximity with a tag attached to such a poster, a user may receive data from the poster such as a URL for a web site and thus obtain further information or purchase tickets. In a peer-to-peer application, near-field communication may be used to exchange data directly between the communication device and the tag. The near-field communication data exchange may be used to initiate communication between the communication device 2 and a second communication device to which the tag is attached using a faster longer-range wireless communication method such as Bluetooth or wireless Ethernet (WiFi). This has the advantage that it eliminates the requirement for manual configuration or "hand-shaking" to establish the wireless connection. An example of a payment and ticketing application is one in which the NFC-enabled communication device 2 acts as an 'electronic wallet' that can replace the myriad of credit, debit, loyalty, pre-paid and other cards that people typically carry around in their wallets today. In such an application, the electronic wallet can, for example, be used to perform transactions via tags located at point-of-sale terminals.

Figure 3:
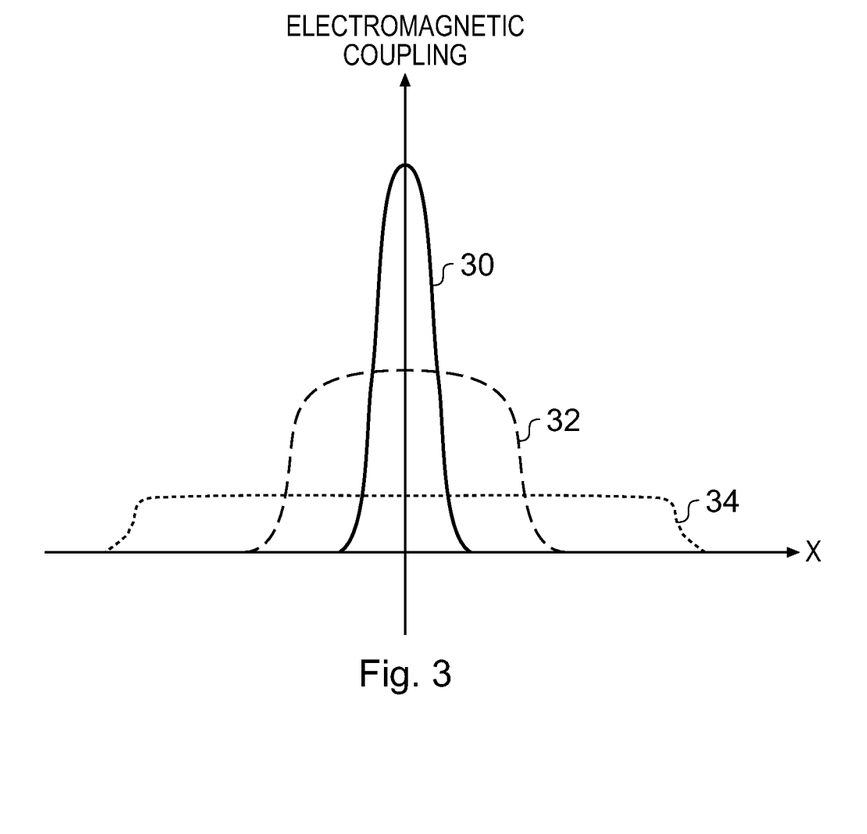
FIG. 3 is a graph which qualitatively shows electromagnetic coupling as a function of the lateral displacement between three dissimilar antennas of a communication device and the antenna of a tag according to an embodiment of the invention.

The communication range of the communication system shown in FIG. 2 is determined by the electromagnetic coupling between the antenna of the communication device 8, 10, 12 or 14 and the antenna of the tag 24. For example, in the embodiment shown in FIG. 2, antenna 24 is formed on a planar substrate and may have a size and a loop geometry that are substantially similar to those of the small loop antenna 8 of the communication device 2. The electromagnetic coupling between such antennas is a function of their relative sizes and geometries and the displacement between them. FIG. 3 qualitatively illustrates the electromagnetic coupling as a function of the lateral displacement designated X between the small loop antenna 24 of tag 20 and the different antennas 8, 10 and 12 of the communication device 2 as indicated by characteristics 30, 32 and 34 respectively. The coupling characteristic 30 between the antenna 8 of the communication device and the antenna 24 of the tag which have small loops of a comparable size and shape, is relatively narrow and has a relatively high peak value. In contrast, the coupling characteristic 34 between the patch antenna 12 of the communications device and the small loop antenna 24 of the tag, is broader with a lower peak value. The coupling characteristic 32 between the large loop antenna 10 of the communication device and the small loop antenna 24 of the tag has a width and a peak value that are intermediate between the widths and peak values respectively of characteristics 30 and 34. FIG. 3 therefore illustrates the general principle that maximum electromagnetic coupling is achieved between two antennas which are substantially matched in size and geometry. Maximum electromagnetic coupling is however achieved at the expense of increased sensitivity to lateral misalignment between the communication device and tag antennas.

Although tag antenna 24 as illustrated in FIG. 2 is substantially matched in size and geometry to small loop antenna 8 of communication device 2, it should be understood that in practice, tag antenna 24 could have any size or geometry and, in particular may be better matched to large loop antenna 10 or patch antenna 12 of communications device 2. The communications device has no prior knowledge of the antenna configuration of the remote device. For example, if tag antenna 24 was substantially matched in size and geometry to large patch antenna 12, then the corresponding coupling characteristic with the large patch antenna of the communication device may be expected to be broader than the characteristic 30 of FIG. 3 but have a comparable peak value. Thus compared to matched small loop antennas, maximum electromagnetic coupling may still be achieved with matched large patch antennas but with a reduced sensitivity to lateral antenna misalignment.

Figure 4:
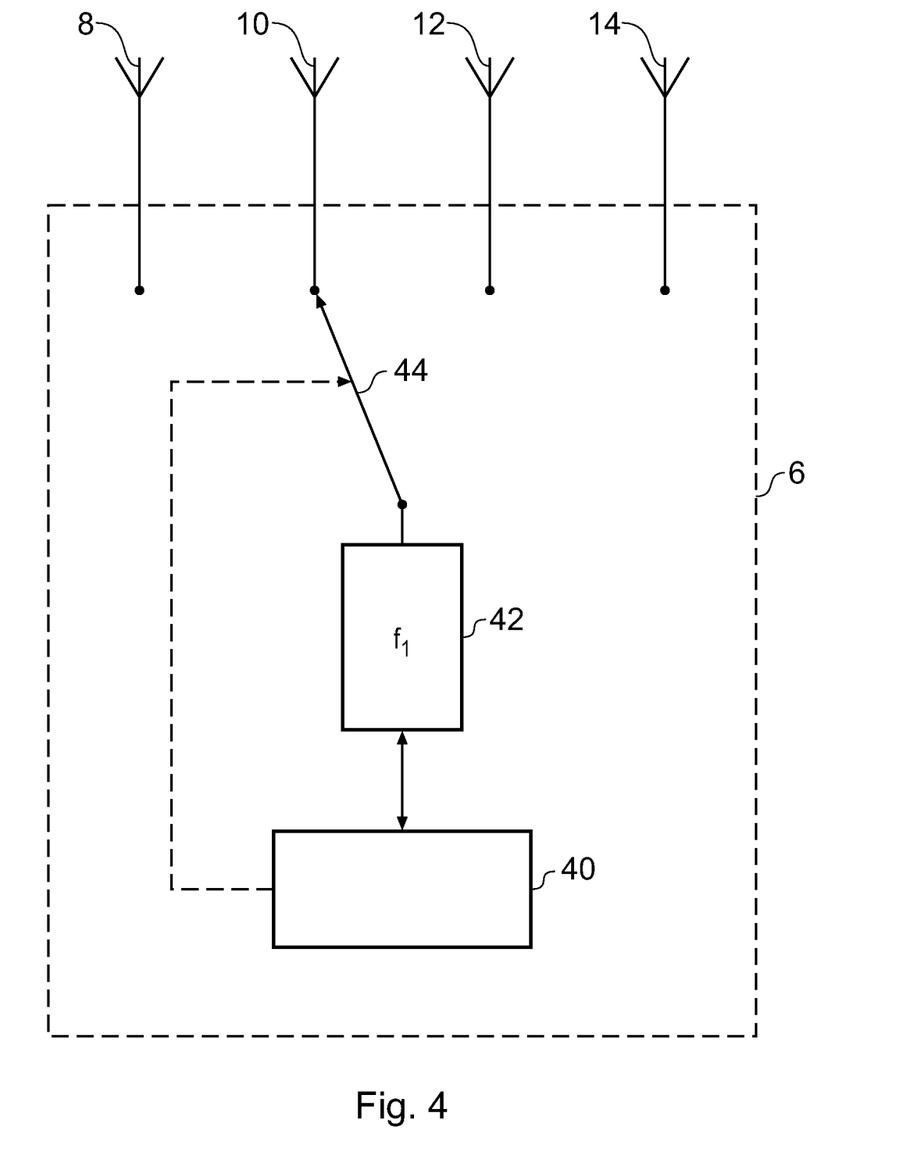
FIG. 4 is a schematic illustration of a first embodiment of a transmit-receive module.

FIG. 4 is a schematic illustration of a first embodiment of transmit-receive device 6 of FIGS. 1 and 2 and also shows the communication device antennas 8, 10, 12 and 14. In this embodiment, transmit-receive device 6 comprises a controller 40, a transceiver 42 operating at an RF carrier frequency $f_1$ and a switch 44. In an embodiment, transceiver frequency $f_1$ may lie in the 13.56 MHz or 2.4 GHz frequency bands. Switch 44 may be fabricated using PIN diodes, FETs or similar devices. In use, switch 44 is controlled by controller 40 and cycled so as to connect transceiver 42 to each of the antennas 8, 10, 12 and 14 in turn in an attempt to communicate with any tag in the vicinity of the communication device. Controller 40 assesses a quality of communication with the tag when using each antenna of the communication device, and based on the results of the assessments, selects an antenna via switch 44 for subsequent communications. The quality may be assessed simply by searching for a correct response from the tag, since using an incorrect antenna is likely to result in no response whatsoever. More complex possibilities include looking at the modulation depth of a response from the tag.

Figure 5:
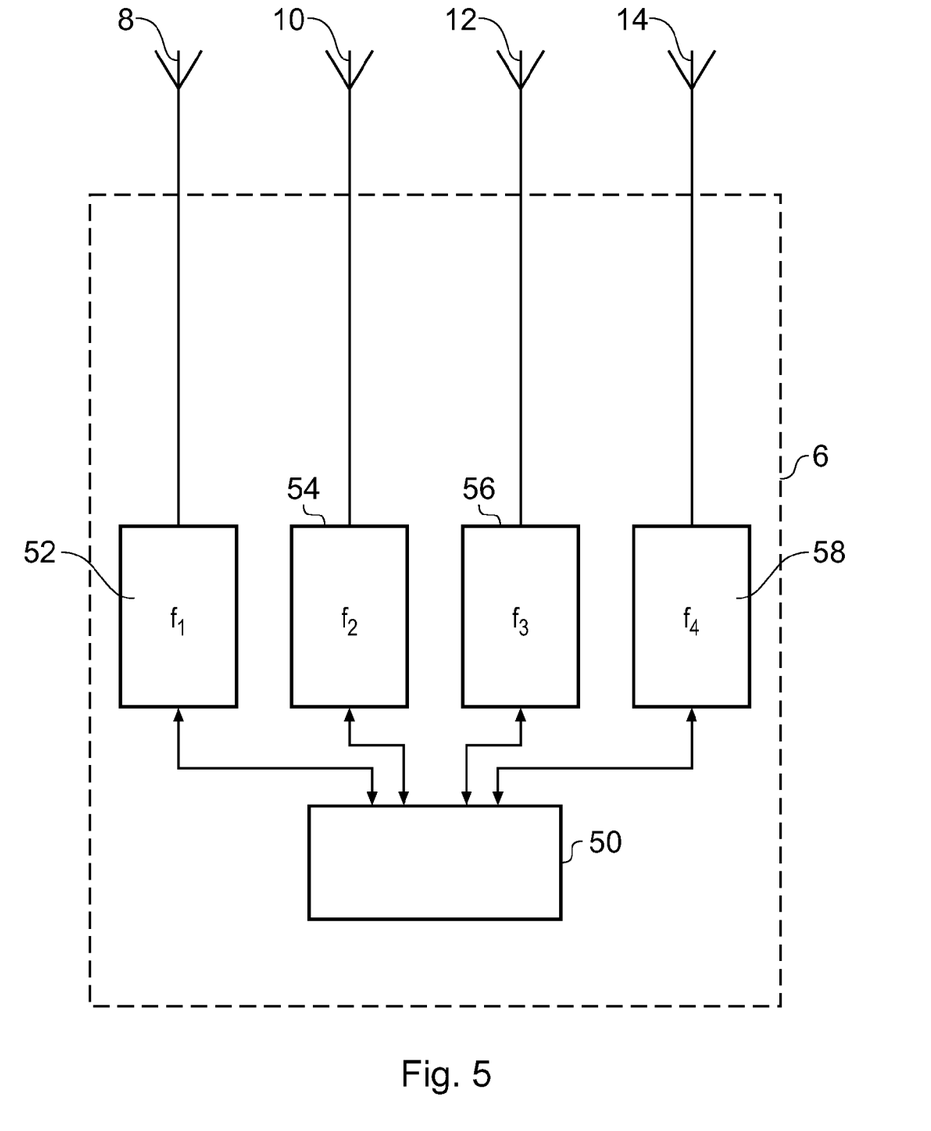
FIG. 5 is a schematic illustration of a second embodiment of a transmit-receive module.

A second embodiment of the transmit-receive device 6 is shown schematically in FIG. 5 which also shows communication device antennas 8, 10, 12 and 14. In this embodiment transmit-receive device 6 comprises a controller 50, a first transceiver 52, a second transceiver 54, a third transceiver 56 and a fourth transceiver 58. Transceivers 52, 54, 56 and 58 operate at RF carrier frequencies $f_1$, $f_2$, $f_3$ and $f_4$ respectively and are connected to respective antennas 8, 10, 12 and 14. In some embodiments of the transceiver frequencies $f_1$ to $f_4$ may lie in the 13.56 MHz or 2.4 GHz frequency bands. In use, controller 50 sequentially activates transceivers 52, 54, 56 and 58 in a cyclical process in an attempt to communicate with any tag in the vicinity of the communications device. Controller 50 assesses a quality of communication with the tag when using each antenna-transceiver combination of the communication device, and based on the results of the assessments, selects an antenna-transceiver combination for subsequent communications.

Figure 6:
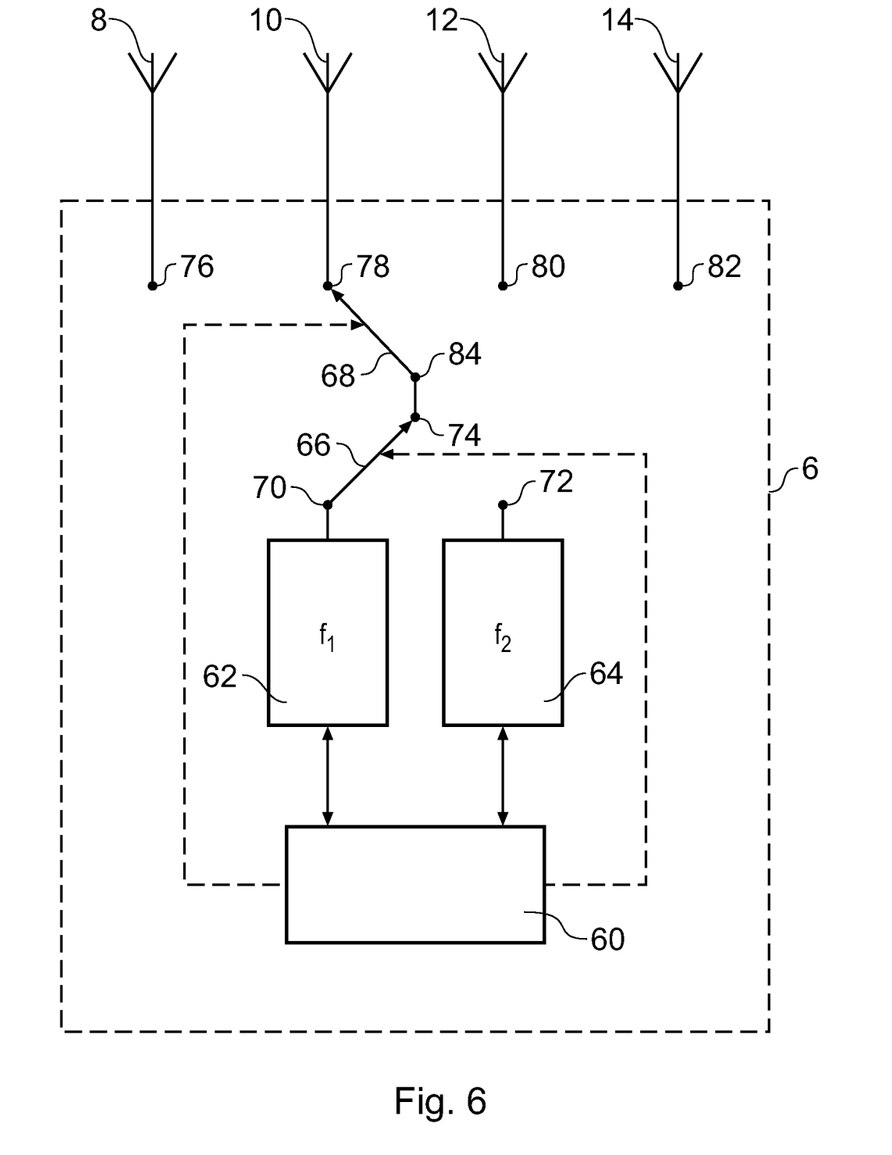
FIG. 6 is a schematic illustration of a third embodiment of a transmit-receive module.

FIG. 6 is a schematic illustration of a third embodiment of transmit-receive device or module 6 comprising a controller 60, a first transceiver 62, a second transceiver 64, a first switch 66 and a second switch 68. First transceiver 62 operates at a first RF carrier frequency $f_1$ while second transceiver 64 operates at a second RF carrier frequency $f_2$. In an embodiment, $f_1$ lies in the 13.56 MHz frequency band while $f_2$ lies in the 2.4 GHz frequency band. Having a first transceiver operating in the 13.56 MHz frequency band enables backwards compatibility with legacy NFC tags, while having a second transceiver operating at a frequency $f_2$ in the 2.4 GHz frequency band enables communications with tags designed to operate at data rates up to or in excess of 10 Mbits/s. The first switch 66 has a first terminal 70, a second terminal 72 and a common terminal 74. The first switch 66 is switchable between a first state in which an electrical connection is made between the common terminal 74 and first terminal 70, and a second state in which an electrical connection is made between the common terminal 74 and second terminal 72. The first switch 66 can be fabricated using PIN diodes, FETs or similar devices. The second switch 68 has a first to fourth terminals 76, 78, 80 and 82 and a common terminal 84. The second switch 68 is switchable between first, second, third and fourth states in which an electrical connection is made between common terminal 84 and first, second, third and fourth terminals 76, 78, 80, and 82 respectively. The second switch 68 can be fabricated using PIN diodes, FETs or similar devices. The first terminal 70 of the first switch 66 is electrically connected to the first transceiver 62. The second terminal 72 of the first switch 66 is electrically connected to the second transceiver 64. The first, second, third and fourth terminals 76, 78, 80, and 82 respectively of the second switch 68 are electrically connected to the first, second, third and fourth antennas 8, 10, 12 and 14 respectively. The common terminal 74 of first switch 66 is connected to the common terminal 84 of the second switch. In use, controller 60 cycles switches 66 and 68 between their different states so as to connect each transceiver to each antenna once during each cycle in an attempt to communicate with any tag in the vicinity of the communication device. Controller 60 assesses a quality of communication with the tag when using each antenna-transceiver combination of the communication device, and based on the results of the assessments, selects an antenna-transceiver combination for subsequent communications.

It is thus possible to select an appropriate antenna to enhance communications with a remote tag.

The invention claimed is:

1. A near-field communication device, the device comprising:
   a controller coupled to at least first and second antennas and at least one first and second transceivers, said controller configured to:
   switch a first switch coupled to the at least first and second transceivers and switch a second switch coupled to the at least first and second antennas between their respective states to connect each of the at least first transceiver and second transceivers to each of the at least first and second antennas;
   assess a quality of near-field communication between the near-field communication device and a further device modulation depth of a response returned by a further device based on at least one transceiver-antenna combination, wherein the at least one transceiver-antenna combination is derived from one or more combinations of the at least first and second transceivers with the at least first and second antennas;
   select one antenna of the at least first and second antennas combination of the at least one transceiver-antenna combination for further communications between the near-field communication device and the further device based on the result of the assessed quality assessment.

2. The near-field communication device of claim 1, wherein the at least one transceiver connects sequentially to the at least first and second antennas.

3. The near-field communication device of claim 1, wherein the at least one transceiver comprises a plurality of transceivers with a separate transceiver of the plurality of transceivers connected to each of the at least first and second antennas.

4. The near-field communication device of claim 1, wherein the at least one transceiver comprises a plurality of transceivers with each transceiver of the plurality of transceivers having a different frequency.

5. The near-field communication device of claim 1, wherein the selected one antenna is the first antenna of the at least first and second antennas, and wherein the selection of the first antenna is based on a determination that an electromagnetic coupling between the first antenna and a further antenna of the further device is substantially different to an electromagnetic coupling between a second antenna of the at least first and second antennas and the further antenna of the further device.

6. The near-field communication device of claim 1, wherein the at least first and second antennas are of a different physical size.

7. The near-field communication device of claim 1, wherein the at least first and second antennas are of a different physical shape.

8. The near-field communication device of claim 1, wherein the at least first and second antennas are formed on at least one planar substrate.

9. The near-field communication device of claim 1, wherein the at least first and second antennas are spatially non-overlapping.

10. A near-field communication method, the method comprising:
    switching a first switch coupled to the at least first and second transceivers and switching a second switch coupled to the at least first and second antennas between their respective states to connect each of the at least first transceiver and second transceivers to each of the at least first and second antennas;
    assessing a quality of near-field communication between a near-field communication device and a further device modulation depth of a response returned by a further device based on at least one transceiver-antenna combination, wherein the at least one transceiver-antenna combination is derived from one or more combinations of the at least first and second transceivers with the at least first and second antennas;
    selecting one of at least and first and second antennas in the near-field communication device combination of the at least one transceiver-antenna combination for further communications between the near-field communication device and the further device based on the result of the assessed quality assessment.

11. The method of claim 10, wherein the assessing further comprises connecting sequentially to the at least first and second antennas.

12. The method of claim 11, wherein the connecting further comprises connecting to each of the at least first and second antennas using a different transceiver.

13. The method of claim 11, wherein the connecting further comprises connecting to each of the at least first and second antennas using a plurality of transceivers, and wherein each transceiver of the plurality of transceivers has a different frequency.

14. The method of claim 10, wherein the selected one antenna is the first antenna of the at least first and second antennas, and wherein the selecting further comprises determining that an electromagnetic coupling between a first antenna of the at least first and second antennas and a further antenna of the further device is substantially different to an electromagnetic coupling between a second antenna of the at least first and second antennas and the further antenna of the further device.

15. A near-field communication device, the device comprising:
    a first transceiver operating at a first carrier frequency and coupled to a first switch and at least one other transceiver operating at another carrier frequency and coupled to the first switch, where the first switch connects the first transceiver to a common node in a first switch first state and connects the at least one other transceiver to the common node in a first switch other state;
    a first antenna coupled to a second switch and at least one other antenna coupled to the second switch, where the second switch connects the first antenna to the common node in a second switch first state and connects the at least one other antenna to the common node in a second switch other state;
    a controller coupled to each transceiver and each switch, wherein the controller:
    switches the first switch and the second switch between their respective states to connect each of the first transceiver and the at least one other transceiver to each of the first antenna and the at least one other antenna, assesses a modulation depth of a response returned by the further device based on at least one transceiver-antenna combination, wherein the at least one transceiver-antenna combination is derived from one or more combinations of the first transceiver and the at least one other transceiver with the first antenna and the at least one other antenna, and selects one combination of the at least one transceiver-antenna combination for further communications between the near-field communication device and the further device based on the result of the assessment.

* * * * *